US012663141B2

(12) United States Patent
Roolf et al.

(10) Patent No.: US 12,663,141 B2
(45) Date of Patent: Jun. 23, 2026

(54) HOUSING ASSEMBLY WITH ALL-ROUND VISIBLE LUMINOUS AREAS

(71) Applicant: Murrelektronik GmbH, Oppenweiler (DE)

(72) Inventors: Tim Roolf, Oppenweiler (DE); Heiko Feisst, Oppenweiler (DE); Jan Maier, Oppenweiler (DE); Henrik Ruf, Oppenweiler (DE)

(73) Assignee: Murrelektronik GmbH, Oppenweiler (DE)

( * ) Notice: Subject to any disclaimer, the term of this patent is extended or adjusted under 35 U.S.C. 154(b) by 0 days.

(21) Appl. No.: 19/013,088

(22) Filed: Jan. 8, 2025

(65) Prior Publication Data

US 2025/0224094 A1 Jul. 10, 2025

(30) Foreign Application Priority Data

Jan. 9, 2024 (DE) ..................... 20 2024 100 086.2

(51) Int. Cl.

| | |
|---|---|
| ***F21V 7/04*** | (2006.01) |
| ***F21V 7/24*** | (2018.01) |
| *F21W 131/403* | (2006.01) |
| *F21Y 115/10* | (2016.01) |

(52) U.S. Cl.

CPC ................ *F21V 7/048* (2013.01); *F21V 7/24* (2018.02); *F21W 2131/403* (2013.01); *F21Y 2115/10* (2016.08)

(58) Field of Classification Search

CPC ... F21V 7/048; F21V 7/04; F21V 7/22; H05K 5/0247; H05K 5/0243; G02B 6/0095

See application file for complete search history.

(56) References Cited

U.S. PATENT DOCUMENTS

| | | | | |
|---|---|---|---|---|
| 7,667,614 | B2 * | 2/2010 | Helm | H01H 9/161 362/240 |
| 7,999,693 | B2 | 8/2011 | Hohler | |
| 8,469,559 | B2 * | 6/2013 | Williams | G02B 6/0033 362/311.06 |
| 9,513,424 | B2 * | 12/2016 | Castillo | G02B 6/0095 |
| 10,083,638 | B2 * | 9/2018 | Lin | A47C 7/40 |
| 10,465,901 | B1 * | 11/2019 | Han | H05K 7/1422 |
| 2006/0102370 | A1 | 5/2006 | Helm et al. | |
| 2008/0049447 | A1 * | 2/2008 | Jung | G02B 6/0075 362/612 |
| 2010/0109897 | A1 | 5/2010 | Hohler | |

(Continued)

FOREIGN PATENT DOCUMENTS

| | | | |
|---|---|---|---|
| CN | 203671384 | U | 6/2014 |
| DE | 102007052377 | A1 | 5/2009 |

(Continued)

*Primary Examiner* — Ismael Negron

(74) *Attorney, Agent, or Firm* — Dilworth IP, LLC

(57) ABSTRACT

A housing assembly for an electronic device, including a connection side on which at least one connection is provided, a first longitudinal side, a second longitudinal side, a first front side, and a second front side. The sides each have at least one housing wall. The housing assembly has at least two indicator lights having one luminous area. The luminous areas are arranged so as to be distributed along the housing assembly such that in an activated state, the luminous areas together emit light signals at least into a hemispherical region around the housing assembly.

17 Claims, 2 Drawing Sheets

(56) References Cited

U.S. PATENT DOCUMENTS

| | | | | |
|---|---|---|---|---|
| 2016/0044217 | A1* | 2/2016 | Richardson | H04N 23/56 348/207.11 |
| 2019/0244490 | A1* | 8/2019 | Su | H03K 17/965 |
| 2020/0280201 | A1* | 9/2020 | Helnerus | H02J 7/0042 |

FOREIGN PATENT DOCUMENTS

| | | | |
|---|---|---|---|
| DE | 202011052067 | U1 | 2/2013 |
| DE | 102017111208 | A1 | 11/2018 |
| DE | 202020106752 | U1 | 11/2021 |
| EP | 2913698 | A1 | 9/2015 |
| EP | 2728316 | B1 | 12/2018 |
| WO | 2004/047246 | A1 | 6/2004 |

* cited by examiner

Fig. 1
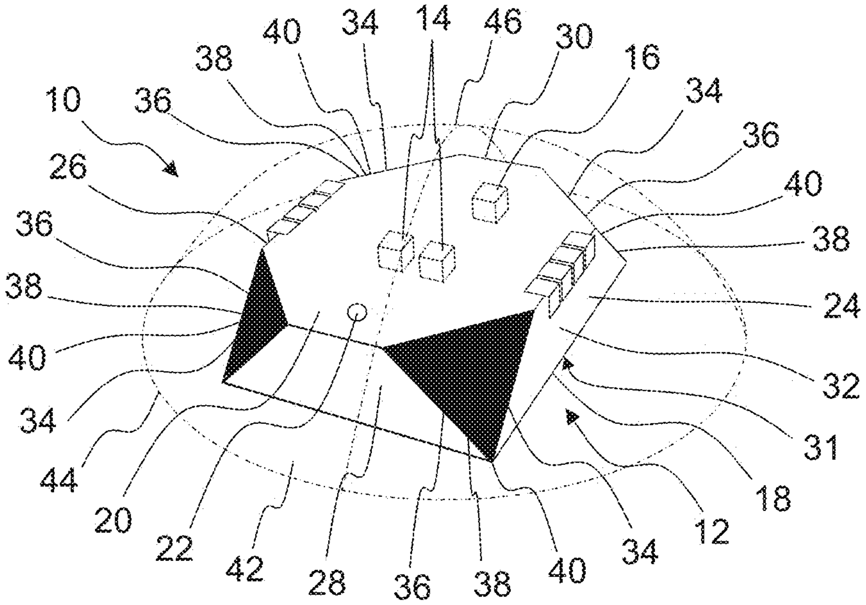
Fig. 2
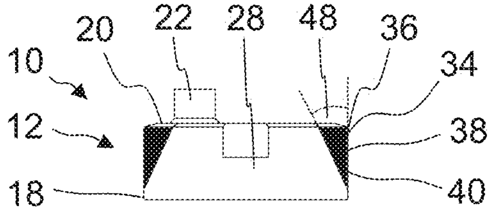
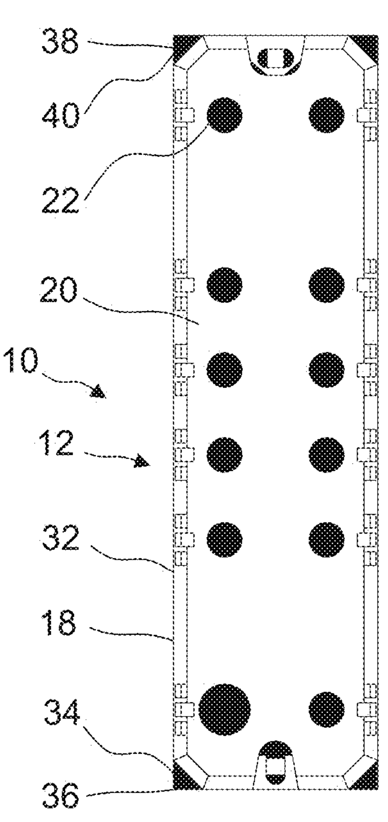
Fig. 3
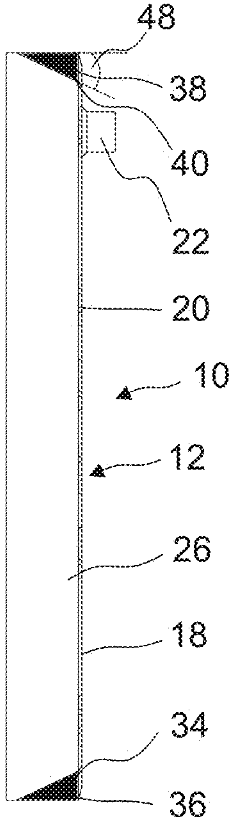
Fig. 4

HOUSING ASSEMBLY WITH ALL-ROUND VISIBLE LUMINOUS AREAS

FIELD OF THE DISCLOSURE

Embodiments of the present disclosure relate to a housing assembly for an electronic device. Furthermore, embodiments of the present disclosure relate to an electronic device.

BACKGROUND

In modern machines and/or installations, numerous electronic devices are often installed, for example as sensors or actuators or generally as infrastructure components.

These devices typically have indicator lights by means of which information about the respective device status is output, for example based of light colors of the light emitted by the indicator lights or light sequences or light patterns. There are norms and guidelines such as IEC61131 or the Machinery Directive, which specify the light colors.

The status of inputs and outputs is often indicated with green, blue or orange light. Faults are however in most cases symbolized by red light.

In many machines and/or installations, numerous optical signals or information are therefore available at different positions, which may lead to a lack of clarity and makes it difficult to identify a specific electronic device.

The visibility of the indicator lights may be limited depending on the installation situation of the electronic device, so that a user cannot or can only partially perceive the light emitted by the indicator light. This is particularly critical when a fault is indicated which has to be remedied. In this case, it is desirable that the user can quickly identify the corresponding electronic device to remedy the fault. Other scenarios may however also be relevant in this context.

Therefore, a compromise has to be found between the good visibility of important optical signals and the fundamental clarity in an installation, as too many optical signals may quickly cause a lack of clarity.

Accordingly, there is a need to eliminate the disadvantages known from the prior art in a simple and cost-effective manner.

SUMMARY

According to the present disclosure, the object is achieved by a housing assembly for an electronic device, comprising a connection side on which at least one connection is provided, a first longitudinal side, a second longitudinal side, a first front side, and a second front side. The sides each have at least one housing wall. The longitudinal sides are each connected to the front sides in transition regions. The housing assembly also has at least two indicator lights, wherein each of the indicator lights has at least one luminous area, and wherein a first of the at least two indicator lights is provided in a first transition region and a second of the at least two indicator lights is provided in a second transition region which differs from the first transition region. The luminous areas are arranged so as to be distributed along the housing assembly such that in an activated state, the luminous areas together emit light signals at least into a hemispherical region around the housing assembly.

A good visibility of these luminous areas when viewing the connection side of the electronic device is thus ensured. At the same time, the luminous areas are however also visible when viewing the first longitudinal side, the second longitudinal side, the first front side and/or the second front side of the electronic device, and can thus fulfil their signaling function. In other words, an all-round visibility of the luminous areas (360° visibility) is thus obtained when viewing the electronic device from the side.

Light emitted by the luminous areas can thus reach any point of a hemisphere surface defined by the hemispherical region which surrounds the housing assembly.

Therefore, at least one of the luminous areas is also visible from any point of the hemisphere surface surrounding the housing assembly, i.e. a corresponding light signal emitted by the at least one of the luminous areas.

In other words, the luminous areas are arranged so as to be distributed along the housing assembly such that in an activated state, they together emit light signals at least into the hemispherical region around the housing assembly such that the light signals can be perceived from any point of the hemisphere surface defined by the hemispherical region.

Therefore, there is a direct line of sight between each point of the hemisphere surface defined by the hemispherical region and at least one point on one of the luminous areas.

It is thus possible to make information about the state of the electronic device more accessible and to represent it more concisely, for example to indicate the maintenance personnel whether and where a fault has occurred in the machine and/or installation and/or maintenance is necessary.

The hemisphere surface defined by the hemispherical region around the housing assembly may basically be at any distance from the housing assembly. "Distance" means here in particular the distance between the center of the housing assembly or a surface of the housing assembly and the hemisphere surface, the center of the housing assembly forming the sphere center of the hemispherical region. For example, the distance between the hemisphere surface and the housing assembly is 10 cm, 50 cm, 1 m, 5 m, 10 m, 50 m or 100 m. The luminous areas or the light signals emitted by the luminous areas are visible from any point of the hemisphere surface at least from this distance. The luminous areas or the light signals emitted by the luminous areas can of course also be perceived from a greater distance, provided that the line of sight is not masked. The mentioned distance of the hemisphere surface to the housing assembly is therefore a minimum distance from which a visibility of the emitted light signals is given from any point of the hemisphere surface.

It may also be provided that the luminous areas are each configured so large that they can be perceived as an object by an average human eye from the hemisphere surface defined by the hemispherical region around the housing assembly. In simple words, the size of the luminous areas may thus correlate with the distance of the hemisphere surface to the housing assembly. For example, the visual angle resolution of an average human eye which describes the smallest angle at which two points can be seen separately, serves as a correlation factor. The correlation factor is, for example, 60 arc seconds.

Specifically, if the distance between the hemisphere surface defined by the hemispherical region around the housing assembly and the housing assembly is 10 cm, luminous areas may be provided, the size, in particular the diameter or side length of which is at least 0.3 mm.

At a distance of 50 cm between the hemisphere surface and the housing assembly, it may be provided that the size of the luminous areas is at least 1.5 mm.

At a distance of 1 m between the hemisphere surface and the housing assembly, it may be provided that the size of the luminous areas is at least 3 mm.

At a distance of 5 m between the hemisphere surface and the housing assembly, it may be provided that the size of the luminous areas is at least 1.5 cm.

At a distance of 10 m between the hemisphere surface and the housing assembly, it may be provided that the size of the luminous areas is at least 3 cm.

At a distance of 50 m between the hemisphere surface and the housing assembly, it may be provided that the size of the luminous areas is at least 15 cm.

At a distance of 100 m between the hemisphere surface and the housing assembly, it may be provided that the size of the luminous areas is at least 30 cm.

It is thus ensured that luminous areas concerned may each be perceived as an object by an average human eye from the given distance, which also generally improves the perceptibility of the signals emitted by the luminous areas.

The hemispherical region around the housing assembly encloses at least five sides of the housing assembly, in particular entirely, namely the connection side, the first longitudinal side, the second longitudinal side, the first front side, and the second front side. In other words, only the lower side, for example, which is opposite the connection side, is not enclosed by the hemispherical region around the housing assembly.

In one variant, the luminous areas are arranged so as to be distributed along the housing assembly such that a lower side of the housing assembly also lies within a sphere sectional surface defined by the hemispherical region. A particularly good visibility of the luminous areas is thus obtained.

It may also be provided that the indicator lights are piloted such that the electronic device actively draws attention to itself to be found. This may be advantageous not only for maintenance but also during installation. For example, the electronic device which is to be connected to a further component, may draw attention to itself by a light signal.

In this context it is also conceivable that the indicator lights are configured to emit a light signal upon request to be found or to indicate a status.

In this respect, only certain information is displayed visually via these luminous areas, as the luminous areas serve the all-round visibility (360° visibility), so that, for example, the status of individual modules or inputs/outputs on the electronic device is emitted via a light, for example an LED on the connection side. The light is assigned to the corresponding connection.

In other words, the status of a link established via a connection is not output via the indicator lights or the luminous areas, but via at least one light associated with the respective connection.

Rather, the indicator lights or luminous areas serve to visually signal a status of the entire electronic device, for example to find the electronic device, for maintenance indication or for fault indication.

In one embodiment of the housing assembly, the luminous areas are substantially flat surfaces. This is technically particularly simple to implement so that the manufacturing costs can be reduced.

The luminous areas may have a triangular shape. This makes it possible to achieve a uniformly good visibility when viewing the electronic device from different sides, the relative area of the luminous area being at the same time kept as small as possible.

In one variant of the present disclosure, the housing is made of a non-transparent or light-proof (opaque) material, for example a metal. In this case, only the luminous areas are made of a transparent or light-conducting material. For example, the luminous areas are designed as light guides and/or are integrated in the housing. The housing may then have appropriate recesses for the luminous areas in the region of the luminous areas.

The luminous areas are manufactured either separately or together with the housing. It is conceivable that the luminous areas are produced using an injection-molding method. Furthermore, in particular in a two-component injection-molding method, it is conceivable to produce the housing and the luminous areas jointly in one manufacturing method, so that the luminous areas are for example directly injection-molded to the housing.

Alternatively or additionally, the housing wall may be formed at least partially from a light-conducting material. For example, the housing wall may be made of a light-conducting material in the regions of the luminous areas. Therefore, a light source within the housing may be used to generate light which is then coupled out of the housing via the housing wall and the luminous areas.

Openings in the housing wall are thus not necessary to realize the indicator lights. It is thus ensured that the electronic components in the housing interior of the electronic device are well protected, especially against water, moisture and/or dust, this depending on the respective field of application of the electronic device.

It is furthermore conceivable that the housing wall is also formed from a light-conducting material in regions away from the luminous areas. Light can thus be coupled into the housing wall at a distance from a luminous area, can be guided along the housing wall, and can be coupled out by the luminous areas. The surface of the housing wall may be at least partially provided, for example coated, with an opaque color. This ensures that the light emanates only at the desired regions, namely the luminous areas.

In one variant of the housing assembly, each indicator light has two luminous areas which are arranged adjacent to each other, wherein the luminous areas of the same indicator light each have a triangular shape and the indicator light has a rectangular shape. Different light signals can be emitted via the adjacent luminous areas and the same housing region, for example based on different light colors of the two adjacent luminous areas. Both light signals can then be perceived simultaneously from one viewing location. Therefore, a higher density of light signals and thus more information about the status of the electronic device are thus available at the viewing location. The indicator light is however compact due to the shape of the luminous areas.

It may be provided that the transition regions are provided in chamfered corner regions of an otherwise cuboid housing comprising the connection side, the longitudinal sides and the front sides. This arrangement has proven to be particularly space-saving, a 360° visibility being however ensured. The connection side, the longitudinal sides and the front sides are thus available for other functions in a substantially unchanged manner, for example for cooling the electronic device or for connection to further components.

In a further variant of the housing assembly, four indicator lights are provided in four different transition regions. The may be arranged, for example, in four corner regions of an otherwise cuboid housing. This makes it possible in a technically simple way to achieve an all-round visibility of the indicator lights for cuboid housings.

The luminous areas may be arranged such that when viewed from one of the front sides, they each enclose an angle in a range of 15° to 35° with the adjacent longitudinal side(s) and/or when viewed from one of the longitudinal sides, they enclose an angle in a range of 15° to 35° with the adjacent front side(s). A uniformly good visibility of the luminous areas is thus ensured when viewing the electronic device from different sides.

It is conceivable that the luminous areas are each aligned at an angle different from 90° with respect to all adjacent housing walls. This also improves the visibility thereof from different viewing directions.

In one embodiment of the housing assembly, it is provided that the luminous areas are each formed in a wedge shape in a side view onto the housing assembly, in particular in a front view onto the assigned longitudinal side and/or in a front view onto the assigned front side. It is thus easily recognizable how the electronic device is oriented, in particular where the connection side is located.

To further improve the visibility and/or the determinability of the orientation of the electronic device, it may be provided that the luminous areas are each formed in a triangular shape in a top view onto the housing assembly.

The object of the present disclosure is further achieved by an electronic device comprising a housing assembly according to the present disclosure and at least one light source which is arranged in the housing assembly and is configured to emit light which is coupled out by the luminous areas.

The advantages discussed in relation to the housing assembly according to the present disclosure similarly apply to the electronic device.

The electronic device may for example be a field device, in particular a field bus module. It is also conceivable that the electronic device is a combination of a field bus module and a signal light.

The light source may be, for example, a central LED arranged in the housing assembly. The use of a plurality of LEDs is also conceivable, in particular in case single-color LEDs are provided.

The several LEDs may in particular be designed to emit light of different wavelength or color to be able to output light signals of different colors via the indicator lights. Alternatively, this effect may also be achieved by a multi-colored light-emitting diode.

Furthermore, it may be provided that the electronic device comprises a control unit which is configured to pilot the at least one light source such that it emits a changing light signal, wherein the changing light signal is characterized by a change in the light intensity and/or in the light color over time. Plotted graphically, the variation over time may for example have the shape of a bell-shaped curve or a Gaussian distribution.

Among other things, the brightness, the duration of illumination, the frequency, the color and/or the emission direction of one or more light signals may be varied. A combination of a plurality of changing parameters is also conceivable, for example a change in color combined with a change in light intensity.

The changes over time may be irregular. This notably attracts the attention of observers to the electronic device.

The control unit may also be configured to pilot the light source such that it preferably emits light signals which serve to draw attention to the electronic device, in particular preferably light signals which serve to merely indicate a device status of the electronic device. This improves the detectability of the electronic device.

Information about individual connections realized via the electronic device are however not output via the indicator lights or the luminous areas.

It is also conceivable that the control unit is configured to pilot the light source such that in a normal state, i.e. a state in which there are no faults and/or no maintenance is necessary, no light is emitted. This may also improve the detectability of individual devices, in particular in that disturbing light emissions originating from adjacent electronic devices are reduced. Furthermore, it is thus possible to save electrical energy during operation of the electronic device.

Furthermore, the control unit may be configured to pilot the light source depending on an external signal. For example, the external signal may be specified by a user or maintenance personnel The control unit may then activate the light source based on the external signal, in particular to make the electronic device easier detectable.

BRIEF DESCRIPTION OF THE DRAWINGS

Further features and advantages of the invention will become apparent from the description below and from the drawings to which reference is made and in which:

FIG. 1 shows a schematic tridimensional representation of a first example embodiment of part of an electronic device according to the invention;

FIG. 2 shows a schematic representation of a second example embodiment of an electronic device according to the invention in a front side view;

FIG. 3 shows the electronic device of FIG. 2 in a connection side view or top view;

FIG. 4 shows the electronic device of FIG. 2 in a longitudinal side view.

DETAILED DESCRIPTION OF THE DRAWINGS

Figure 5:
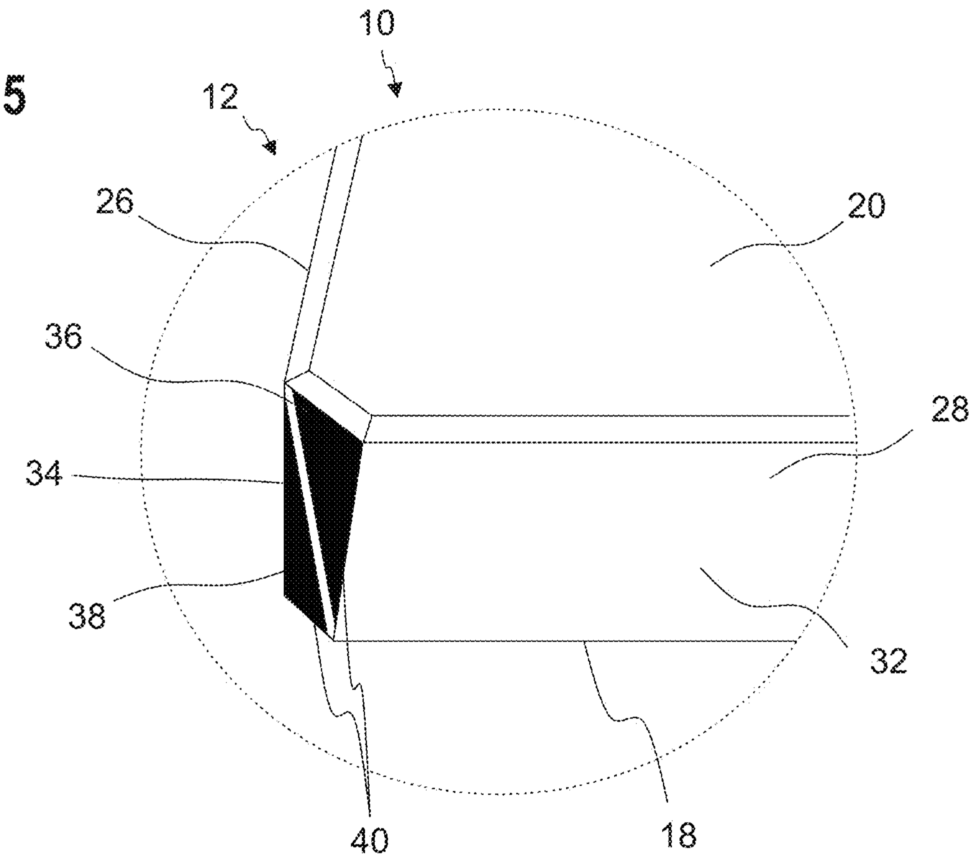
FIG. 5 shows a schematic tridimensional representation of a detail of a third example embodiment of an electronic device according to the invention.

FIG. 1 shows a schematic representation of an electronic device 10 according to the invention.

The electronic device 10 has a housing assembly 12. Furthermore, the electronic device 10 has two light sources 14, for example light-emitting diodes, which can emit light of different color. The light sources 14 are arranged in the housing assembly 12, which is why in the present case, they are represented in a dashed line.

Furthermore, the electronic device 10 also has a control unit 16 which is also arranged in the housing assembly 12, which is why the control unit 16 is also represented in a dashed line. The control unit 16 is configured to pilot two light sources 14 such that they each emit a light signal.

In the example embodiment, the light sources 14 are piloted such that the emitted light signal changes over time, in particular with regard to the light intensity and/or the light color thereof. The two light sources 14 can for example flash, in particular alternately. The flashing can also occur irregularly, i.e. without a fixed temporal pattern.

The piloting of the light sources 14 by the control unit 16 can occur automatically or depending on an external signal or command specified by a user.

The housing assembly 12 comprises a housing 18 having a connection side 20 on which at least one connection 22 is provided, in particular a plurality of connections 22. Furthermore, the housing 18 comprises a first longitudinal side 24, a second longitudinal side 26, a first front side 18, and a second front side 30 and a lower side 31.

The sides 20, 24, 26, 28, 30, 31 each have a housing wall 32 or are formed by it.

The longitudinal sides 24, 26 are each connected to the front sides 28, 30 in transitions regions 34. The transition regions 34 also each have a housing wall 32 or are formed by it.

In the example embodiment, the transition regions 34 are provided in chamfered corner regions 36 of the otherwise cuboid housing 18. In other words, the housing 18 would be a cuboid if the transitions regions 34 were not chamfered.

The housing assembly 12 comprises in each of the transition regions 34 one respective indicator light 38. The housing assembly 12 therefore has a total of four different transition regions 34 and thus also four indicator lights 38.

In other words, four indicator lights 38 are thus provided, which are arranged in four different transition regions 34.

Each of the indicator lights 38 has a luminous area 40. One of the luminous areas 40 is thus located in each of the transitions regions.

In the example embodiment, the luminous areas 40 are formed by the housing walls 32 in the respective transitions regions 34.

For this purpose, the housing walls 32 consist of a light-conducting material at least in the transition regions 34. Light generated by the light sources 14 in the housing interior can be coupled into the housing walls 32 in the transition regions 34 and can be coupled out of the housing walls 32 to the outside again via the luminous areas 40, as a result of which a light signal is emitted.

It is furthermore conceivable that the housing walls 32 are also made of a light-conducting material in the region of the connection side 20, the first longitudinal side 24, the second longitudinal side 26, the first front side 28, the second front side 30, and/or the lower side 31. It is in particular also possible that all housing walls 32 are made of a light-conducting material. In regions in which no luminous areas 40 are provided, an additional opaque layer can be provided, for example a coat of lacquer which prevents the light in these regions from being coupled out of the electronic device 10. It is thus ensured that the light emanates only at the desired locations, namely the luminous areas 40.

In this design, the light sources 14 do not necessarily have to be arranged in regions of the indicator lights 38 or luminous areas 40. A (separately formed) light guiding in the housing walls 32 along the connection side 20, the first longitudinal side 24, the second longitudinal side 26, the first front side 28 and/or the second front side 30 is also possible. The coupling-in and the coupling-out of light can thus occur locally separately from each other at different positions of the housing assembly 12.

Of course, this is not to be understood in a restrictive manner. The housing 18 can also be made of a non-transparent or light-proof (opaque) material, a metal, for example.

The luminous areas 40 are manufactured either separately from the housing 18 or together with the housing 18. For example, they can have been injection-molded directly to the housing 18 using a two-component injection-molding method. It is however also conceivable that the luminous areas 40 have been retrofitted into the housing 18.

In the example embodiment 40, the luminous areas 40 are formed as flat surfaces having a triangular shape.

In addition, the luminous areas 40 are arranged so as to be distributed along the housing assembly 12 such that in an activated state, they together emit light signals into an hemispherical region 42 around the housing assembly 12.

FIG. 1 shows the hemispherical region 42 schematically. It is characterized by an hemisphere surface 44 and a sphere sectional surface 46 which together define the boundaries or the size of the hemispherical region 42.

In the example shown in FIG. 1, the luminous areas 40 are arranged such that the light signals they emit reach any point of the hemisphere surface 44 of the hemispherical region 42.

In other words, at least one of the luminous areas 40 is visible from any point of the hemisphere surface 44 surrounding the housing assembly 12, so that at least one light signal emitted by these luminous areas 40 can be perceived.

There is thus a direct line of sight between any point of the hemisphere surface 44 defined by the hemispherical region 42 and one of the luminous areas 40.

For example, the distance between the housing assembly 12 and the hemisphere surface 44 is 10 cm, 50 cm, 1 m, 5 m, 10 m, 50 m or 100 m. The luminous areas 40 or the light signals emitted by the luminous areas 40 are visible from any point of the hemisphere surface 44 at least from this distance. The luminous areas 40 or the light signals emitted by the luminous areas 40 can of course also be perceived from a greater distance.

In the example shown in FIG. 1, the hemispherical region 42 completely surrounds the housing assembly 12.

This ensures a good visibility of the luminous areas 40, even if the electronic device 10 is viewed from the side rather than directly from the connection side 20.

FIGS. 2 to 4 show a schematic representation of a second example embodiment of an electronic device 10 according to the invention in a front side view, a connection side view and a longitudinal side view.

The electronic device 10 shown in FIGS. 2 to 4 corresponds in several essential aspects to the electronic device 10 shown in FIG. 1, so that only the differences will be discussed below. Identical and/or functionally identical components are provided with the same reference numerals.

In the electronic device 10 shown in FIG. 2, the luminous areas 40 of the housing assembly 12 are each aligned at an angle different from 90° with respect to all housing walls 32 of the adjacent sides 20, 24, 26, 28, 30 of the (cuboid) housing 18. Each of the luminous areas 40 is thus visible from more than one of the sides 20, 24, 26, 28, 30.

The luminous areas 40 are basically arranged such that, when viewed from one of the front sides 28, 30, they each form an angle 48 of 25° with the adjacent longitudinal sides 24, 26. They simultaneously form, when viewed from one of the longitudinal sides 24, 26, an angle 48 of 25° with the adjacent front sides 28, 30.

It can thus be achieved that when viewing the electronic device 10 from different directions, the visible entire luminous area (i.e. the visible portions of the respective luminous areas 40 considered together) is at least approximately identical.

Figuratively speaking, when the electronic device 10 is viewed from one of the front sides 28, 30 (cf. FIG. 2) or from one of the longitudinal sides 24, 26 (cf. FIG. 4), only two of the four luminous areas 40 are visible. In such a front view onto one of the longitudinal sides 24, 26 and/or front sides 28, 30, the luminous areas 40 are configured in a wedge shape.

However, when viewed from the connection side 20 (cf. FIG. 3), all four luminous areas 40 are visible. In such a top view onto the housing assembly 12, the luminous areas 40 are each configured in a triangular shape, in particular as isosceles right-angled triangles.

The visible entire luminous area is however always approximately the same size, regardless of from which of the sides 20, 24, 26, 28, 30 it is viewed. This ensures good visibility of emitted light signals irrespective of the viewing direction.

FIG. 5 shows a schematic tridimensional representation of a detail of a third example embodiment of an electronic device 10 according to the invention.

It corresponds in several aspects to the electronic devices 10 shown in FIGS. 1 to 4, so that only the differences will be discussed below. Identical and/or functionally identical components are provided with the same reference numerals.

The electronic device 10 of FIG. 5 also has a housing assembly 12 which comprises a substantially cuboid housing 18, except for chamfered corner regions 36.

The chamfered corner regions 36 are at the same time transition regions 34.

In the example embodiment, the housing assembly 12 comprises four indicator lights 38. One of the indicator lights 38 is provided in each of the transition regions 34.

The electronic device 10 of FIG. 5 has the particular feature that each of the indicator lights 38 has a rectangular shape and two luminous areas 40 which are arranged adjacent to each other and each have a triangular shape.

The electronic device 10 can be used in a more versatile way due to the generally larger number of luminous areas 40 which are visible from one viewing point, as compared with the previous example embodiments.

It is thus conceivable that one of the adjacent luminous faces 40 serves to draw the attention of a viewer to the electronic device 10, for example by flashing, and the other of the adjacent luminous faces 40 serves as an indicator light, for example to indicate an operating status of the electronic device 10 and/or a machine or installation.

Furthermore, the figures show that the connections 22 are themselves each assigned to lights which serve to indicate the status of the connection established via the respective connection 22. The lights 20 may be provided at the edges of the connection side 20, as is particularly visible in FIG. 3.

The status information of the connections established via the connections 22 is thus output only via the lights provided on the connection side 20, but not via the indicator lights 38 or die luminous areas 40 which only serve to output information relating to the entire electronic device 10.

LIST OF REFERENCE NUMERALS

| Reference Numeral | Designation |
|---|---|
| 10 | Electronic device |
| 12 | Housing assembly |
| 14 | Light source |
| 16 | Control unit |
| 18 | Cuboid housing |
| 20 | Connection side |
| 22 | Connection |
| 24 | First longitudinal side |
| 26 | Second longitudinal side |
| 28 | First front side |
| 30 | Second front side |
| 31 | Lower side |
| 32 | Housing wall |
| 34 | Transition region |
| 36 | Chamfered corner region |
| 38 | Indicator light |
| 40 | Luminous area |
| 42 | Hemispherical region |
| 44 | Hemisphere surface |
| 46 | Sphere sectional surface |
| 48 | Angle |

The invention claimed is:

1. A housing assembly for an electronic device, comprising a connection side on which at least one connection is provided, a first longitudinal side, a second longitudinal side, a first front side, and a second front side, wherein the sides each have at least one housing wall, wherein the longitudinal sides are each connected to the front sides in transition regions, wherein the housing assembly has at least two indicator lights, wherein each of the indicator lights has at least one luminous area, wherein a first of the at least two indicator lights is provided in a first transition region, wherein a second of the at least two indicator lights is provided in a second transition region which differs from the first transition region, and wherein the luminous areas are arranged so as to be distributed along the housing assembly such that in an activated state, the luminous areas together emit light signals at least into a hemispherical region around the housing assembly, wherein the housing wall(s) is/are at least partially made of a light-conducting material.

2. The housing assembly according to claim 1, wherein the luminous areas are substantially flat surfaces.

3. The housing assembly according to claim 1, wherein the luminous areas have a triangular shape.

4. The housing assembly according to claim 1, wherein each indicator light has two luminous areas which are arranged adjacent to each other, wherein the luminous areas of the same indicator light each have a triangular shape and the indicator light has a rectangular shape.

5. The housing assembly according to claim 1, wherein the transition regions are provided in chamfered corner regions of an otherwise cuboid housing which comprises the connection side, the longitudinal sides and the front sides.

6. The housing assembly according to claim 1, wherein four indicator lights are provided in four different transition regions.

7. The housing assembly according to claim 1, wherein the luminous areas are arranged such that, when viewed from one of the front sides, they each enclose an angle in a range of 15° to 35° with the adjacent longitudinal side(s).

8. The housing assembly according to claim 1, wherein the luminous areas are arranged such that, when viewed from one of the longitudinal sides, they each enclose an angle in a range of 15° to 35° with the adjacent front side(s).

9. The housing assembly according to claim 1, wherein the luminous areas are each aligned at an angle different from 90° with respect to all housing walls of the adjacent sides.

10. The housing assembly according to claim 1, wherein the luminous areas are each formed in a wedge-shape in a side view onto the housing assembly.

11. The housing assembly according to claim 1, wherein the luminous areas are each formed in a wedge-shape in a front view onto the assigned longitudinal side.

12. The housing assembly according to claim 1, wherein the luminous areas are each formed in a wedge-shape in a front view onto the assigned front side.

13. The housing assembly according to claim 1, wherein the luminous areas are each formed in a triangular shape in a top view onto the housing assembly.

14. An electronic device comprising a housing assembly according to claim 1 and at least one light source which is arranged in the housing assembly and is configured to emit light coupled out by the luminous areas.

15. The electronic device according to claim 14, comprising a control unit which is configured to pilot the light source such that it emits a changing light signal, wherein the changing light signal is characterized by a change over time in at least one of the light intensity or the light color.

16. The electronic device according to claim 15, wherein the change over time is irregular.

17. A housing assembly for an electronic device, comprising a connection side on which at least one connection is provided, a first longitudinal side, a second longitudinal side, a first front side, and a second front side, wherein the sides each have at least one housing wall, wherein the longitudinal sides are each connected to the front sides in transition regions, wherein the housing assembly has at least two indicator lights, wherein each of the indicator lights has at least one luminous area, wherein a first of the at least two indicator lights is provided in a first transition region, wherein a second of the at least two indicator lights is provided in a second transition region which differs from the first transition region, and wherein the luminous areas are arranged so as to be distributed along the housing assembly such that in an activated state, the luminous areas together emit light signals at least into a hemispherical region around the housing assembly, wherein each indicator light has two luminous areas which are arranged adjacent to each other, wherein the luminous areas of the same indicator light each have a triangular shape and the indicator light has a rectangular shape.

* * * * *